United States Patent [19]

Keen

[11] 4,252,458
[45] Feb. 24, 1981

[54] LOCKING SELF-ALIGNING COUPLER AND LOCKING APPARATUS

[75] Inventor: Ralph O. Keen, Roseville, Mich.

[73] Assignee: Taper Line, Inc., Warren, Mich.

[21] Appl. No.: 901,336

[22] Filed: May 1, 1978

Related U.S. Application Data

[63] Continuation-in-part of Ser. No. 684,348, May 7, 1976, Pat. No. 4,086,946.

[51] Int. Cl.³ ............................................. F16B 7/00
[52] U.S. Cl. ................................... 403/287; 403/362; 403/320
[58] Field of Search ............... 403/362, 320, 77, 287, 403/366, 371, 370, 367, 374, 373

[56] References Cited

U.S. PATENT DOCUMENTS

| | | | |
|---|---|---|---|
| 1,183,190 | 5/1916 | Hansell | 151/21 C |
| 1,381,110 | 8/1945 | Chandler | 151/21 R |
| 1,984,454 | 12/1934 | Belyavin | 403/367 X |
| 2,550,511 | 4/1951 | Williams | 151/23 |
| 2,580,745 | 1/1952 | Engstrom | 151/21 B |
| 2,641,345 | 6/1953 | Dunkelow | 151/21 C |
| 3,406,992 | 10/1968 | Grofuess | 403/77 X |
| 3,691,883 | 9/1972 | Ingram | 403/366 X |

FOREIGN PATENT DOCUMENTS

| | | | |
|---|---|---|---|
| 70883 | 8/1946 | Norway | 403/320 |
| 871405 | 6/1961 | United Kingdom | 151/21 C |

Primary Examiner—Andrew V. Kundrat
Attorney, Agent, or Firm—Remy J. VanOphem

[57] ABSTRACT

A novel locking apparatus is provided for use on self-aligning rod end couplers, reciprocating machines, hydraulic cylinders, transfer machines, and the like. The apparatus comprises at least one slot in an end face of an outer body and means for uniformly deforming a wall of the slot so as to obtain a uniform deformation of the wall of an annular bore, thereby locking and clamping the outer body upon an annular body engaged within the annular bore.

14 Claims, 4 Drawing Figures

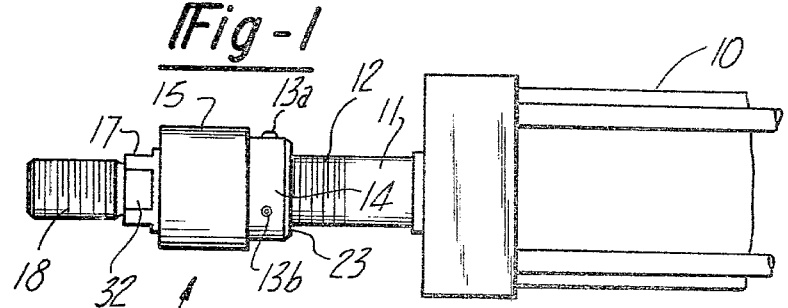
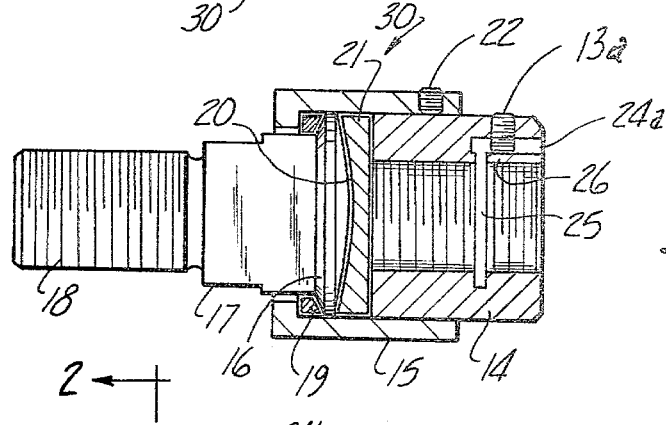
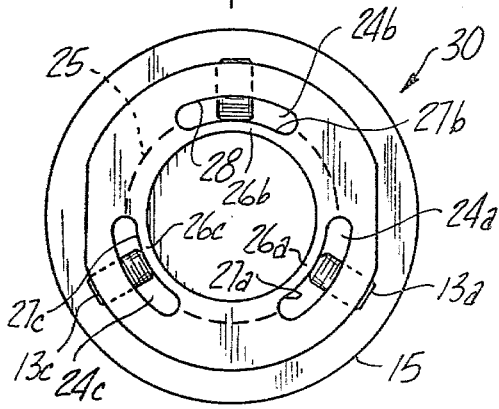
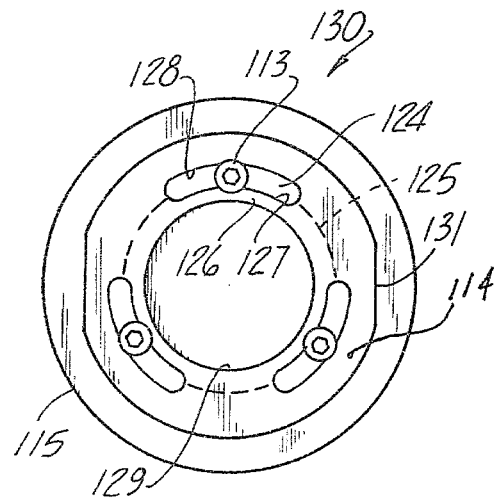

LOCKING SELF-ALIGNING COUPLER AND LOCKING APPARATUS

CROSS REFERENCE

This is a continuation-in-part of my patent application Ser. No. 684,348, filed May 7, 1976, now U.S. Pat. No. 4,086,946 which is incorporated herein by reference.

BACKGROUND OF THE INVENTION

The present invention belongs to the field of locking a male member within a female member such as locking the rod end of a hydraulic cylinder to a rod end coupler.

DESCRIPTION OF THE PRIOR ART

The apparatus of the prior art had used methods such as set screws which either locally deform threads and cylinder walls, or press directly against the male member to be locked. Most such apparatus have involved threaded engagement but splines and tapered smooth cylindrical bores are also used. Jam nuts have also been used with apparatus such as rod end couplers and reciprocating machines. The set screws have the disadvantage of damaging the threads on a threaded male member and the jam nuts have proven ineffective for use on such items as self-aligning rod end couplers.

Although the locking apparatus may be used with any male/female member pair to be locked, a preferred embodiment in a self-aligning rod end coupler will be discussed. This is not intended to in any way limit the invention. Most self-aligning couplers have features which allow some degree of inaccuracy in linearly aligning the rods to be coupled. A spherical surface within the coupler allows to a limited degree what is known in the industry as spherical movement and axial float. This self-aligning feature is defeated, however, when the rod ends are not tightly locked into the coupler.

Existing methods have proven substantially ineffective in maintaining proper rod to coupler locking. Since the rod ends cannot be exactly linearly aligned, two costly results are observed where the coupling loosens from ineffective locking:

(1) cylindrical bearing wear and rod seal wear occur in the hydraulic cylinder attached to the rod, due to side loads and binding;
(2) machinery is deflected due to weight shifts from misalignment of the rod ends; and,
(3) binding in the rod coupler and the machinery.

Precision bore equipment has been used to avoid these difficulties, however, manufacturing of such close tolerances is both expensive and time consuming. Furthermore, even precision bore equipment has proven ineffective for many applications.

The rod end coupler embodiment may be used in any application where a sliding movement is required.

SUMMARY OF THE INVENTION

The present invention avoids the inconveniences of couplers and other apparatus which are provided with deformable inserts, since a locking apparatus according to the present invention can be easily threaded into position (where the bore and male member are threaded) for assembly of elements upon a threaded male member, and once in position, can easily be locked in such a position until disassembly is required. In a locking coupler, according to the present invention, the amount of locking force is not predetermined and can be adjustably controlled to any value required. In addition, there is no risk of causing any damage to the thread of a threaded male member because of the uniform distribution of the locking force along a significant portion of the entire axial length of the threaded bore of the female member.

The locking apparatus, according to the present invention, does not require any auxiliary lock nut or lock washer; is applicable to any conventional or nonconventional type of locking apparatus such as couplers, reciprocating machines, transfer machines, and the like; and results in assembly which is neat in appearance, occupies little room, does not cause any interference with tools generally used for torquing such as wrenches and spanners, and provides a safe assembly with any amount of locking effect desired.

The present invention thus provides a locking apparatus which may be made of any otherwise conventional body such as couplers, tapered fitted cylinders, and the like, which by uniform deformation of the wall of the female member of the apparatus once the male member has been inserted into position, causes a uniform clamping and locking effect of the female member upon the threaded male member with which it is engaged, and which, by generally requiring uniform deformation of threaded bores, splines, and the like within the elastic limit of the material of the apparatus, enables the wall of the bore of the female member to return to its original configuration prior to removing the male member from its engagement whenever dismantling is required. Furthermore, the locking force created by the locking self-aligning coupler embodiment of the present invention is uniformly distributed along a significant portion of the entire length of a threaded bore of a threaded locking self-aligning coupler, thereby generating a substantially greater clamping and locking effect than heretofore available by conventional self-aligning couplers. Furthermore, the locking coupler of the present invention is of simple structure, is easy to manufacture by conventional machining means, is substantially low in cost, is neat in appearance, and is reusable indefinitely.

Other objects and advantages of the present invention will become apparent to those skilled in the art when the following description of the best embodiment contemplated in practicing the invention is read in conjunction with the accompanying drawings.

BRIEF DESCRIPTION OF THE DRAWINGS

FIG. 1 is an example of the use of the locking apparatus in the form of a rod end coupler, here shown locked onto the rod end of a hydraulic cylinder;

FIG. 2 is a longitudinal cross-sectional view as seen from line 2—2 in FIG. 3;

FIG. 3 is a plan view of a locking coupler according to the present invention, showing radially inserted set screws in recesses leading into the slots and additionally showing the preferable depth of a circular groove radially extending from the inside diameter of the coupler's annular member;

FIG. 4 is a plan view of a locking coupler according to the present invention, showing wedging means longitudinally inserted in the slots and also showing the preferable depth of the circular groove.

DETAILED DESCRIPTION OF THE PREFERRED EMBODIMENT

Referring now to the drawings, and more particularly to FIG. 1, an example of a rod end coupler 30 utilizing locking according to the present invention is shown locked on the threaded rod end 12 of the hydraulic cylinder 10. In the example illustrated, set screws 13 are utilized to lock the annular body member 14 onto the threaded rod end 12 of the hydraulic cylinder 10.

FIG. 2 shows a self-aligning rod end coupler in detail, employing set screws for locking both the annular body member 14 to a threaded rod end and for locking the coupler housing 15 to the annular body member 14. A threaded recess is provided on the periphery of the annular body member near the end of said member. A set screw is threadably inserted therein. A slot 24a is formed longitudinally from the end of the annular body member 14 and near the inside diameter of the annular body member 14 in such a way that a resilient segment portion 26 is formed between the slot 24a and the inside diameter of the annular body member 14.

When set screw 13a is driven tight in the threaded recess provided therefor, the inner thread of annular body member 14 tightly engages threaded shaft portion therein, thus holding the annular body member 14 secured to the threaded rod end. When it is desired to remove a rod end from the threaded bore of the annular body member 14, the set screw 13a is backed up and the inside threaded diameter of the annular body member 14 is released from tight engagement with the threaded rod end.

The circular groove 25 is located in such a way that insertion of the wedging means 13a deflects only that segment portion 26 between the circular groove and the end face of the annular body member 14. It is thus apparent from this description that the preferred embodiment of the invention exhibits the ability to provide substantially greater locking forces than the prior art because of the ability of the annular body member 14 (referring again to FIG. 2) to deform uniformly along its entire axial threaded bore length from the end face of annular member 14 to where the circular groove 25 intersects both the slot 24a and the internal threaded bore of annular member 14. Extensive testing has shown the deformation to be uniform in character so that the threaded annular member 14 locks up along the entire axial length of this axial deformation. Each and every thread between the end face of annular member 14 and the circular groove 25 locks up on each and every thread of an inserted rod end. It is this uniform deformation which allows the annular member 14 to exhibit a substantially greater locking force than the prior art. As earlier described, non-uniform deformation along the axial length of a locking member such as annular member 14 can cause highly localized forces resulting in damage to threaded rod ends and also resulting in poor holding force.

FIG. 2 shows a cylindrical housing 15 with an annular rod member mounted therein. The annular rod member typically has a threaded end 18 of smaller diameter than the small diameter portion of the bore of the cylindrical housing 15. The annular rod members also have a larger rod end mounted within the housing 15. The larger rod end will have a spherical surface on either the innermost end at 20 to spherically cooperate with the cylindrical body 21, or a spherical surface 16 on the shoulder between the larger and smaller diameter portions of the annular rod member to spherically cooperate with the spherical surface at 19, or both 16 and 20. The inner cylindrical body 21 is mounted within the housing 15 flush against both the surface 20 and the end face of the annular body member 14. As shown in FIG. 1, the annular rod member may have an intermediate shoulder with flat surface such as 32, notches, or other means permitting the annular rod member to be held in place for engagement with a female body to be threaded on the threaded end 18 of the annular rod member.

Referring to FIG. 3, at least one slot and preferably a plurality of slots such as 24 are formed in the annular body member 14. The slots may be straight, or arcuate as illustrated, and it is contemplated that they may extend from one face of the annular body member 14 through the entire longitudinal thickness of the annular body member to the other face thereof, or at least partly from one face into the annular body member 14. It is important to note that although the slots 24 may be straight or arcuate, they may not intersect the threaded bore of the annular body member 14 along its axial length from face to face or any portion thereof. A circular groove, depicted as 25, is cut on the surface of the threaded bore of the annular body 14. The circular groove 25 is preferably located at a position away from the face of annular body member 14 which engages a threaded rod end, so that the circular groove will intersect the slots 24 at a predetermined longitudinal position corresponding approximately to the bottom of the threaded recess where the set screws 13 are inserted.

FIG. 3 illustrates radially inserted set screws 13, inserted from the periphery of the annular body member 14. Deformation of the resilient segment portions 26 is accomplished by pressure on the walls 27 with the set screws 13. The set screws 13 are accepted into recesses from the periphery of the annular body member 14 which recesses enter the slots 24. After the annular body member 14 has been tightly engaged upon a male member such as threaded rod end 12 (of FIG. 1), each set screw 13 is tightened in such a manner that it causes the resilient segment portions 26 to deform as earlier described. Also, as earlier described, the deformation of the resilient segment portions 26 from the internal walls 27 is controllable and variable in degrees depending upon the amount of torque applied to the threaded set screws 13. For example, set screw 13a may be inserted to a lesser depth than set screw 13b and to a greater depth than set screw 13c. Again, the deformation of the internal threaded bore is designed to be within the normal elastic modulus of the substance forming the annular body member 14 such that when the set screws 13 are unthreaded from the recess in the periphery of annular body member 14, the internal walls 27 of the annular body member 14 are allowed to assume their original position, thereby allowing the internal threaded bore of annular body member 14 to assume its original circular shape and permitting a rod end such as threaded rod end 12 to be disengaged from the annular body member 14.

FIG. 4 illustrates a different embodiment of the invention whereby the wedging means to provide deformation of the resilient segment portion 126 is accomplished by longitudinally inserting the wedging means 113 into the slots 124 from the end face of an annular body member such as 114. After a rod end has been tightly inserted into the bore of annular body member 114, the wedging means 113 are inserted to the desired depth in the slots 124. This uniformly radially deflects the resilient portion 126 of the bore wall 129. The deformation of the resilient portion 126 is both controllable and variable in degrees depending upon the amount of torque applied when inserting wedging means 113. The deformation of the internal bore 129 is designed to be within the normal elastic modulus of the substance forming the annular body member 114 such that when the wedging means 113 is withdrawn from the slot 124, the internal wall 127 of the annular body member 114 is allowed to assume its original position, thereby allowing the internal bore 129 to assume its previous circular shape and permitting the annular body member 114 to be disengaged from a rod end or other male member inserted therein.

In the examples of the invention illustrated, the slots 24 are substantially concentric with the threaded bore of the annular body member 14. This provides for a symmetrical design and facilitates cutting of the slots by means of an appropriate milling cutter; the annular body members being mounted on a threaded mandrel on a machine table and the milling cutter effecting a cut while the table is rotated an appropriate number of degrees. Although the example of locking self-aligning rod end couplers, according to the invention, has been shown provided with three slots, it is obvious that in some applications only one slot 24 may be required, and in other configurations, especially where the annular body member 14 has a substantially large diameter and when, additionally, a strong locking action is desired, more than three slots may be provided in the annular body member.

It is preferable to have the slots 24 disposed relatively close to the threaded bore of the annular body member such that the metal, or other material, of the annular body member 14 between the slot and the peripheral surface of the annular body member 14 has greater rigidity than the metal of the annular body member between the slots 24 and the threaded bore of the annular body member 14, i.e. the resilient segment portion. The recesses for radially inserted wedging means, whether threaded or unthreaded, are preferrably formed equidistant from the ends of the slots, but they need not be centrally disposed relative to the opposite walls of the slots 24 and they may even be formed in only one of such opposite walls.

It will be readily apparent to those skilled in the art, that the locking apparatus of the invention may be modified by omitting the internal thread shown in FIG. 2 to form a modified locking apparatus or rod end coupler which can be fitted on an unthreaded shaft, thus providing a locking ring. Further, the locking apparatus of the invention may be modified by providing a splined internal bore which can be fitted on a splined shaft, thus providing a means of locking splined male and female members. Still further, and as shown, the locking apparatus may be used more than once on a given piece of equipment such as with set screws 22 and 13a of FIG. 2.

Having thus described the invention by way of illustrative examples thereof, what is sought to be protected and claimed by United States Letters Patent is as follows:

1. A locking apparatus comprising:
   an annular housing;
   an annular body member having one end mounted in said housing and an opposite end extending therefrom, said annular body member further comprising:
   two end faces;
   a longitudinal bore extending between said two end faces; and
   at least one slot substantially concentric with said longitudinal bore between said two end faces of said annular body member, said at least one slot defining a resilient segment portion of uniform circumferential width along its axial length, said resilient segment portion configured to freely deflect radially, said resilient segment portion further communicating with said annular body member proximate the ends of said at least one slot, said resilient segment portion being fixed at each end of said at least one slot and further being symmetrically deformable by said concentricity of said at least one slot;
   wedging means engageable with two opposite walls of said at least one slot for communicating with said walls so as to cause a uniform deformation of said longitudinal bore, said wedging means producing a radial deflection of said resilient segment portion fixed at both ends such that the deflection of said resilient segment porton is generalized along the length thereof to increase the holding power of said annular body member; and
   a circular groove formed in said longitudinal bore, said circular groove extending radially outwards from said longitudinal bore beyond at least one of said two opposite walls of said at least one slot.

2. The locking apparatus of claim 1, wherein said annular housing, said longitudinal bore of said annular body and said annular body are cylindrical.

3. The locking apparatus of claim 2, wherein and said cylindrical longitudinal bore of said annular body is threaded.

4. The locking apparatus of claim 1, wherein said wedging means comprises a tapered set screw engaging a threaded recess extending partially into at least one of said opposite walls of said at least one slot.

5. The locking apparatus of claim 1, wherein said annular groove is formed in said longitudinal bore at a predetermined longitudinal distance substantially equal to the depth of said at least one slot.

6. The locking apparatus of claim 1, wherein said longitudinal bore is splined.

7. A locking self-aligning coupler comprising:
   a housing having a step bore defining first and second inside diameters with a shoulder therebetween;
   an annular rod member having one end mounted within said housing, said annular rod member comprising:
   a first portion having a first outside diameter smaller than said first inside diameter of the step bore of said housing;
   a second portion adjacent said first portion, said second portion having a second outside diameter larger than said first inside diameter of said housing;
   a shoulder surface between said first and said second portions of said annular rod member;
   an end face adjacent said second portion of said annular rod member having a spherical surface thereon;
   a cylindrical body having an end face defining a spherical surface, said cylindrical body being mounted coaxial with and substantially adjacent to said housing, said cylindrical body further being mounted adjacent said annular rod member for cooperation therewith;

an annular body member mounted within said housing and adjacent said cylindrical body, said annular body member comprising:

two end faces;

a longitudinal bore extending between said two end faces; and at least one slot substantially concentric with said longitudinal bore, said at least one slot extending perpendicularly away from one of said two end faces into said annular body member substantially parallel to said longitudinal bore, said at least one slot defining a resilient segment portion of uniform circumferential width along its axial length, said resilient segment portion configured to freely deflect radially, said resilient segment portion further communicating with said annular body member proximate the ends of said at least one slot, said resilient segment portion being fixed at each end of said at least one slot and further being symmetrically deformable by said concentricity of said at least one slot;

wedging means engageable with two opposite walls of said at least one slot for communicating with said walls so as to cause a uniform deformation of said longitudinal bore of said annular body member, said wedging means producing a radial deflection of said resilient segment portion fixed at both ends such that the deflection of said resilient segment portion is generalized along the length thereof to increase the holding power of said annular body member; and a circular groove formed in said longitudinal bore of said annular body member, said circular groove extending radially outwards from said longitudinal bore beyond at least one of said walls of said at least one slot.

8. The locking self-aligning coupler of claim 7, wherein said wedging means comprises a set screw engaging a threaded recess extending partially into at least one of said opposite walls of said at least one slot.

9. The locking self-aligning coupler of claim 7, wherein said longitudinal bore of said annular body member is threaded.

10. The locking self-aligning coupler of claim 7, wherein said second inside diameter of said step bore is splined and said annular body member is formed to engage the splined second inside diameter of the said step bore for cooperation therewith.

11. The locking self-aligning coupler of claim 8, wherein said circular groove is formed in said longitudinal bore of said annular body member at a longitudinal position substantially co-planar with one end of said wedging means when said wedging means is fully engaged in said at least one slot.

12. The locking self-aligning coupler of claim 7, wherein said shoulder surface between said first and second portions of said annular rod member is spherical, and wherein further the shoulder between said first and second inside diameters of said housing has a spherical surface thereon, said shoulder surface communicating with said spherical shoulder surface of said annular rod member for cooperation therewith.

13. The locking self-aligning coupler of claim 7 further comprising means for locking said housing to said annular body member.

14. A locking apparatus comprising:

an annular body housing;

an annular body member having one end mounted in said housing and an opposite end extending therefrom, said annular body member further comprising:

two end faces;

a longitudinal bore perpendicular to one of said end faces; and at least one slot substantially concentric with said longitudinal bore, said at least one slot radially spaced a predetermined distance from said longitudinal bore and substantially parallel thereto for a predetermined depth, said at least one slot defining a resilient segment portion of uniform circumferential width along its axial length, said resilient segment portion configured to freely deflect radially, said resilient segment portion further communicating with said annular body member proximate the ends of said at least one slot, said resilient segment portion being fixed at each end of said at least one slot and further being symmetrically deformable by said concentricity of said at least one slot;

wedging means engageable with two opposite walls of said at least one slot for communicating with said walls so as to cause a uniform deformation of said longitudinal bore, said wedging means producing a radial deflection of said resilient segment portion, fixed at both ends such that the deflection of said resilient segment portion is generalized along the length thereof to increase the holding power of said annular body member; and a circular groove formed in said longitudinal bore, at a predetermined depth substantially equal to the predetermined depth of said at least one slot, said circular groove extending radially outward from said longitudinal bore beyond at least one of said walls of said at least one slot.

* * * * *

UNITED STATES PATENT OFFICE
CERTIFICATE OF CORRECTION

Patent No. 4,252,458            Dated  February 24, 1981

Inventor(s)  Ralph O. Keen

It is certified that error appears in the above-identified patent and that said Letters Patent are hereby corrected as shown below:

Column 3, line 36, after the words "end face" insert ----23----.

Column 3, line 60, after the word "member" insert ----17----.

Column 3, line 61, after the word "member" insert ----17----.

Column 4, line 6, after the word "member" insert ----17----.

Column 4, line 8, after the word "member" insert ----17----.

Column 4, line 10, after the word "member" insert ----17----.

Column 4, line 34, delete the word "on" and insert ----between----.

Same line, after the numeral "27" insert ----and 28----.

UNITED STATES PATENT OFFICE
CERTIFICATE OF CORRECTION

Patent No. 4,252,458　　　　　　　　　Dated　February 24, 1981

Inventor(s) Ralph O. Keen

It is certified that error appears in the above-identified patent and that said Letters Patent are hereby corrected as shown below:

Column 5, line 12, delete the word "permitting" and insert ----permits----.

*Signed and Sealed this*

*Twenty-first* Day of *July 1981*

[SEAL]

Attest:

Attesting Officer

GERALD J. MOSSINGHOFF

*Commissioner of Patents and Trademarks*